United States Patent [19]

Stensson et al.

[11] Patent Number: 4,458,966
[45] Date of Patent: Jul. 10, 1984

[54] EARTH-CONNECTOR FOR A RUBBER-CUSHIONED RAIL VEHICLE WHEEL

[75] Inventors: Bo G. Stensson, Brösarp; Egil K. Ljung, Bjärred, both of Sweden

[73] Assignee: SAB Industri AB, Landskrona, Sweden

[21] Appl. No.: 407,618

[22] Filed: Aug. 12, 1982

[30] Foreign Application Priority Data

Aug. 27, 1981 [SE] Sweden .................. 8105072

[51] Int. Cl.$^3$ .............................. H01R 4/66
[52] U.S. Cl. ........................ 339/10; 295/7; 295/11; 339/14 R
[58] Field of Search ............ 295/7, 11; 191/63; 339/14 R, 14 RP, 10

[56] References Cited

U.S. PATENT DOCUMENTS

| | | | |
|---|---|---|---|
| 1,023,574 | 4/1912 | Linbald | 295/11 |
| 2,954,259 | 9/1960 | Kordes | 295/11 |
| 3,619,472 | 11/1971 | Davis | 191/63 |
| 3,706,959 | 12/1972 | Norden | 339/14 R |
| 3,934,921 | 1/1977 | Nelken | 295/1 |
| 4,358,148 | 11/1982 | Kirschner | 295/7 |

FOREIGN PATENT DOCUMENTS 2324060  3/1975  Fed. Rep. of Germany .

*Primary Examiner*—John McQuade
*Assistant Examiner*—Paula Austin
*Attorney, Agent, or Firm*—Laurence R. Brown

[57] ABSTRACT

A conductor provides electrical connection passing through a rubber cushioned rail vehicle wheel having rubber elements in between a central metal wheel portion and an outer flanged metal wheel tire. Thus, a length of wire has a central conductor connection tag attached to the central wheel portion with U-shaped spring clips at each end straddling over and electrically connecting with an internal mating ridge on the tire extending between two spaced rubber elements separating the central portion and tire.

4 Claims, 6 Drawing Figures

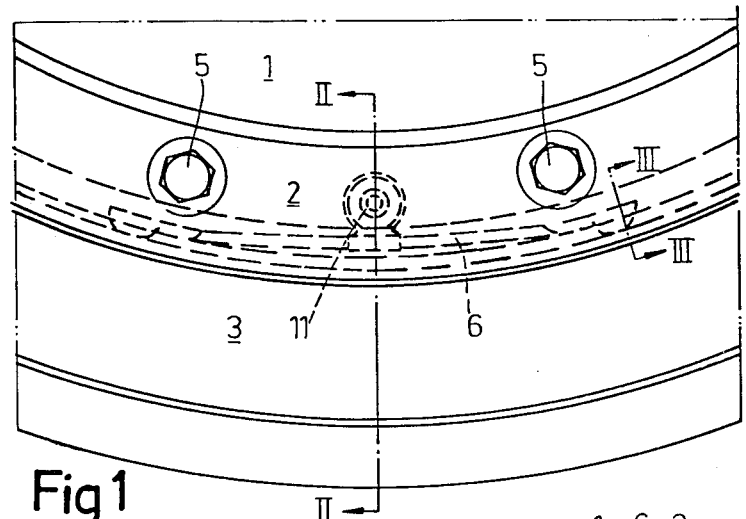
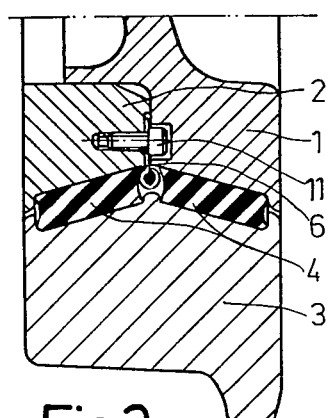
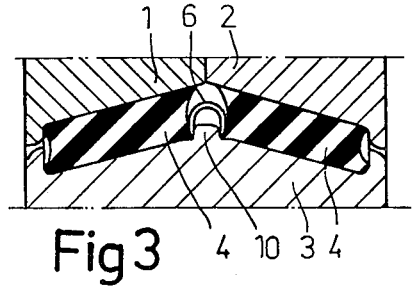
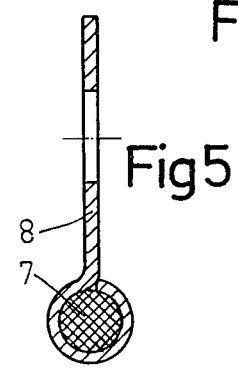
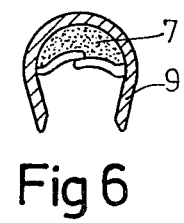
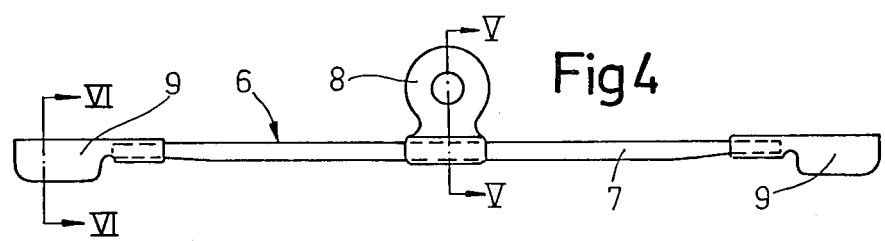

EARTH-CONNECTOR FOR A RUBBER-CUSHIONED RAIL VEHICLE WHEEL

TECHNICAL FIELD

This invention relates to a device for providing electrical connection through a rubber-cushioned rail vehicle wheel, comprising a central part, a wheel tire and circumferential rubber elements between said central part and tire.

BACKGROUND ART

A typical example of a rail vehicle wheel of the kind defined above is a so called V-wheel, where two flat rubber rings are arranged in a V (as viewed in cross section) between a central part (a wheel center with a clamp ring) and a wheel tire, the purpose of the rubber primarily being to reduce different kinds of noice emanating from a wheel moving on a rail.

There is no electrical connection between the wheel tire and the remainder of the wheel. Such a connection is required for providing the necessary earthing and for other purposes.

An external connection (by means of a copper wire) has proven unsatisfactory for different reasons: the screw for attaching the wire to the wheel tire reduces the wearing depth of the tire and the important tire strength, the external wire is highly exposed to mechanical and environmental damage, and it may even be difficult to obtain and maintain the necessary electrical connection.

An internal connection is thus more advantageous. However, several attempts to arrive at an acceptable solution have unsuccessfully been made. One such attempt was based on the teachings of DE-AS No. 23 24 060. Different reasons for the failures may be listed: too low contact pressures for obtaining the necessary connection especially when the surfaces are unclean, rusty and so forth, too high stresses on the wire or the like, difficulties at the mounting and dismounting for tire exchange, and so forth.

THE INVENTION

A practical solution to the problem cited above is according to the invention attained in that a conducting wire extends generally circumferentially in an internal free space between neighbouring rubber elements and is connected on the one hand to the central part, preferably by means of a screw in a tag on the wire, and on the other hand to the wheel tire by means of a generally horse-shoe-shaped spring clip, attached to the wire and resiliently held on to a circumferential ridge between said rubber elements.

In this way an available circumferential space in the wheel is utilized in a natural way. The advantages with the internal location as regards freedom from external damage of different kinds are taken care of, and the wire is only exposed to low and harmless stresses. The mounting is easy and safe. Last, but not least, the spring clip coacting with the internal tyre ridge will provide the necessary high contact pressure to guarantee electrical contact even if the surfaces are rusty, dirty or painted.

In a practical embodiment the wire is provided with a tag at an intermediary location and a spring clip at each end so as to obtain double security at the tire side. Further the tag is attached to a clamp ring of the central part of the wheel, which gives mounting advantages.

The spring clip is preferably provided with comparatively sharp internal edges so as to further increase the contact pressure.

At least two, but in many cases more, connecting devices are provided in a wheel for maximum security.

BRIEF DESCRIPTION OF THE DRAWING

The invention will be described in further detail below reference being made to the accompanying drawing, in which FIG. 1 is a side view of a part of a rubber-cushioned wheel with an internal earth connection according to the invention, FIGS. 2 and 3 are sections along the lines II—II and III—III respectively in FIG. 1 (FIG. 3 being on a larger scale), FIG. 4 is a side view of a connector according to the invention and FIGS. 5 and 6 are sections along the lines V—V and VI—VI respectively in FIG. 4 but to a larger scale.

DETAILED DESCRIPTION OF A PREFERRED EMBODIMENT

A rubber-cushioned wheel consists of a central part comprising a wheel center 1 and a clamp ring 2, a flanged wheel tire 3, rubber rings 4 with a flat cross-sectional shape and clamped to a prestressed condition in the generally V-shaped space between the central part 1, 2 and the tire 3, and screw joints 5 for holding the clamp ring 2 against the wheel center 1.

Due to the rubber rings 4 no metallic and electrical connection exists between the wheel center 1 and the wheel tire 3. For different reasons such a connection, called an earth connection, is required.

For this purpose a connector 6 is internally arranged in the wheel. It has the following design, reference being made to FIGS. 4–6.

A braided copper wire 7 is at a central location provided with a tag 8, which is attached by clamping and soft soldering or the like and has a hole as shown. A spring clip 9 is clamped with crimp fit to each end of the wire 7. The clip 9 is generally horse-shoe-shaped in cross section so as to resiliently fit over a circumferential ridge 10 between the rubber rings 4 in the wheel tire 3, as appears in FIG. 3. Due to a comparatively sharp edge at the inner surfaces of the clip legs the contact pressure is high with resulting secure connection even if the ridge surfaces have become rusty or dirty or even if the surfaces are painted before mounting.

As appears in FIG. 2 the tag 8 is attached to the clamp ring 2 by means of a screw 11 before mounting of the wheel, necessary notches being provided in the clamp ring and the wheel centre 1.

It is normal to provide each wheel with two connectors 6, but a higher number is of course possible for maximum security.

Modifications are possible within the scope of the appended claims. Especially it is to be noted that the inventive connector may be used for other rubber-cushioned wheels within the general definition thereof. Also, the tag 8 may quite as well as being attached to the clamp ring 2 be mounted to the wheel centre 1, if such mounting gives advantages in certain cases.

We claim:

1. A device for providing electrical connection through a rubber-cushioned rail vehicle wheel, comprising a central wheel part, a wheel tire with a circumferential ridge facing the central wheel part and two neighboring circumferential rubber elements alongside the circumferential ridge between said central part and tire, characterized in that a conducting wire extends generally circumferentially in an internal free space between the neighbouring rubber elements and is connected on the one hand to the central part, and on the other hand to the wheel tire by means of a generally horse-shoe-shaped spring clip, attached to the wire and resiliently held on to the circumferential ridge between said rubber elements.

2. A device according to claim 1, wherein the wheel central part comprises a clamp ring adjacent said tire characterized in that the wire is provided with a tag at an intermediary location and a spring clip at each end, that the tag is attached to the clamp ring of the central part, and that each spring clip is provided with comparatively sharp internal edges for cooperation with the ridge.

3. A device according to claim 2, characterized in that at least two conducting wires are provided in said wheel.

4. A device according to claim 1, wherein the conducting wire has an intermediate tag connected to the central part by means of a screw.

* * * * *